United States Patent [19]
Dorenbosch

[11] Patent Number: 5,959,546
[45] Date of Patent: Sep. 28, 1999

[54] METHOD AND APPARATUS FOR ROAMING ADDRESS VALIDATION FOR SELECTIVE CALL DEVICES

[75] Inventor: Jheroen Pieter Dorenbosch, Paradise, Tex.

[73] Assignee: Motorola, Inc., Schaumburg, Ill.

[21] Appl. No.: 08/856,958

[22] Filed: May 15, 1997

[51] Int. Cl.⁶ ............................. H04Q 5/22; H04Q 1/30
[52] U.S. Cl. ..................... 340/825.52; 340/311.1; 455/31.1; 455/31.3; 455/32.1; 455/432
[58] Field of Search ..................... 455/456, 458, 455/432, 33.2, 31.1, 31.3, 32.1; 340/825.44, 825.47, 825.52, 311.1; 370/312, 313, 331

[56] References Cited

U.S. PATENT DOCUMENTS

| | | | |
|---|---|---|---|
| 5,600,312 | 2/1997 | Willard et al. | 340/825.47 |
| 5,610,919 | 3/1997 | Willard et al. | 370/336 |
| 5,625,351 | 4/1997 | Willard et al. | 340/825.52 |
| 5,649,302 | 7/1997 | Ayerst et al. | 370/313 |
| 5,682,147 | 10/1997 | Eaton et al. | 340/825.03 |
| 5,740,533 | 4/1998 | Lin | 455/432 |
| 5,745,481 | 4/1998 | Phillips et al. | 370/313 |
| 5,777,560 | 7/1998 | Sakai et al. | 340/825.44 |

*Primary Examiner*—Wellington Chin
*Assistant Examiner*—Isaak R. Jama
*Attorney, Agent, or Firm*—Pablo Meles; Charles W. Bethards

[57] ABSTRACT

A method of operating a selective call receiver (170) that roams a plurality of separate simulcast areas (20) including a specific area where the selective call receiver shares the same address with a second selective call receiver but where only one of the receivers is able to decode a message broadcast in the specific area includes the steps at the selective call receiver of receiving a target address, a tag representative of the specific area, and an associated message. Then the associated message is decoded (40) when both the target address and the tag representative of the specific area match an address (38) and a tag (36) stored in a memory location (77 or 76) within the selective call receiver and otherwise ignoring the associated message when either the target address or the tag representative of the specific area fail to match the tag and the address stored.

10 Claims, 4 Drawing Sheets

METHOD AND APPARATUS FOR ROAMING ADDRESS VALIDATION FOR SELECTIVE CALL DEVICES

FIELD OF THE INVENTION

This invention relates in general to a selective call communication system that allows for roaming and more specifically to a system that validates address using identification tags.

BACKGROUND OF THE INVENTION

Motorola's FLEX™ Roaming system for selective call receivers utilizes long addresses (or global addresses) and short addresses (or local addresses) for large network wide systems and for localized systems respectively. Thus, a pager operating in its "home" will usually look for a local address and alternatively a global address if the pager is programmed in such manner. As one can imagine, the local addresses or short addresses are limited in number and are sometimes repeated in some of the separate localized systems. Therefore, a problem exists when a pager with a certain address roams into another localized system area where the same certain address is used by another pager. In such a case, both pagers will pick up messages intended to be broadcast to only the one pager in its localized home zone as shown in system 10 of FIG. 1. System 10 shows two geographically separated simulcast areas X and Y and Pagers A and B that both decode the same local or short address. When Pager A travels to Pager B's home zone or local area, messages sent to B will also be inadvertently decoded by pager A. Thus, a need exists in preventing a roaming pager from decoding messages meant for another pager having the same address when the roaming pager is outside its home zone.

SUMMARY OF THE INVENTION

In a first aspect of the present invention, a method and messaging system for operating a selective call receiver device that roams a plurality of separate simulcast areas within a messaging system including a specific area where the selective call receiver device shares the same address with other selective call receiver devices but where only one of the selective call receiver devices is able to decode a message broadcast in the specific area, comprises the steps at the selective call receiver device of receiving a target address, at least one tag representative of the specific area, and an associated message. Then, the selective call receiver device decodes the associated message when both the target address and the at least one tag representative of the specific area match an address and a tag stored in a memory location within the selective call receiver device. Otherwise, the selective call receiver device ignores the associated message when either the target address or the at least one tag representative of the specific area fail to match the tag and the address stored.

In another aspect of the present invention, a selective call receiver device that may roam among a plurality of separate simulcast areas within a messaging system including a specific area that requires the selective call receiver device to share the same address with at least another selective call receiver device in at least one of the plurality of separate simulcast areas that is not the specific area comprises a receiver for receiving a target address, at least one tag representative of the specific area, and an associated message. The selective call receiver further comprises a processor for decoding the associated message when the target address and the at least one tag representative of the specific area match an address and a tag stored in a memory location within the selective call receiver unit and which is further programmable to ignore the associated message when either the target address or the at least one tag representative of the specific area does not match the tag and the address stored.

DETAILED DESCRIPTION

Figure 1:
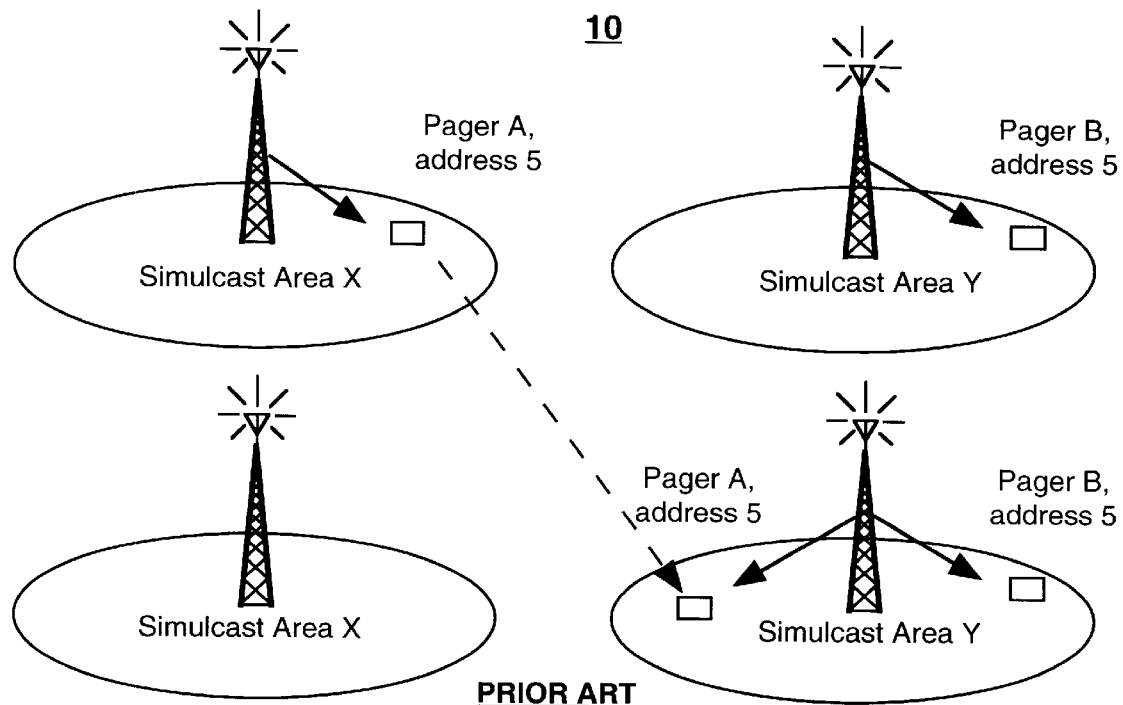
FIG. 1 is a block diagram of a communication system in accordance with an existing system.
Figure 2:
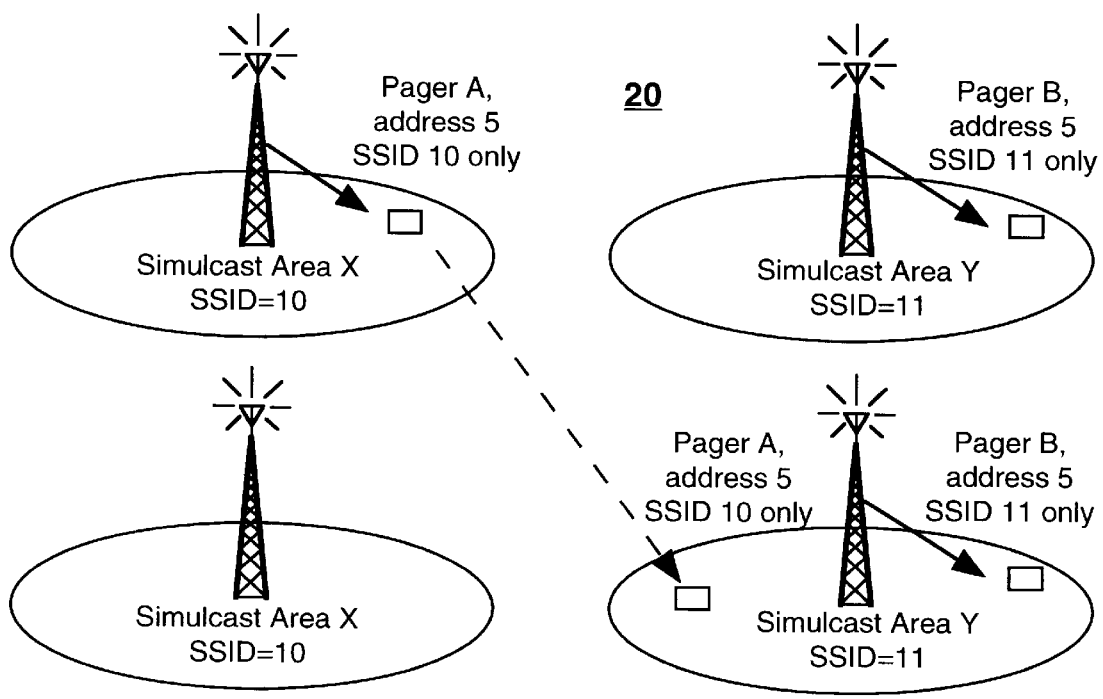
FIG. 2 is a block diagram of a communication system in accordance with the present invention.

Referring to FIG. 2, there is shown a communication system 20 in accordance with the present invention having a plurality of selective call receivers A and B as well as base transmitter stations forming separate simulcast areas X and Y. The base transmitter stations preferably transmit a tag that provides a Simulcast System identifier (SSID). In the example shown, selective call receivers A and B share the same address "5", but only decode messages that include tags that match a specific area such as their "home zone". In the case of device A, the SSID home zone is "10" and device B's SSID home zone is "11". Thus, when device A roams into Simulcast Area Y, it will not decode messages having the same short address "5" as device B because only device B can decode messages targeted for address "5" that include a broadcast tag of SSID=11.

In summary, the present invention provides for broadcasting one or more tags in each simulcast area and further provides for programming such tags into portable communication device such as a selective call receivers or transceivers that are capable of roaming. An algorithm is preferably used in the portable communication device that allows the device to decode an address only when the programmed tag matches a broadcasted tag. If different simulcast areas use different tags, the portable communication device that roams into another area will no longer validate its address and will not receive messages intended for units that have the same address in the specified area. It is certainly contemplated within the scope of the invention that "tags" could include a wide variety of identifiers that would distinguish one area from another. For example, color codes, transmitter identifiers, SSID, Network Identifiers (NID), Service Provider Identifiers (SPID), Zone Identifiers (ZID), Subzone Identifiers (ZID) and frequency (or any combination thereof) could be a few of the many means of providing a tag that would assist in targeting messages to one of several devices that have the same address.

Figure 3:
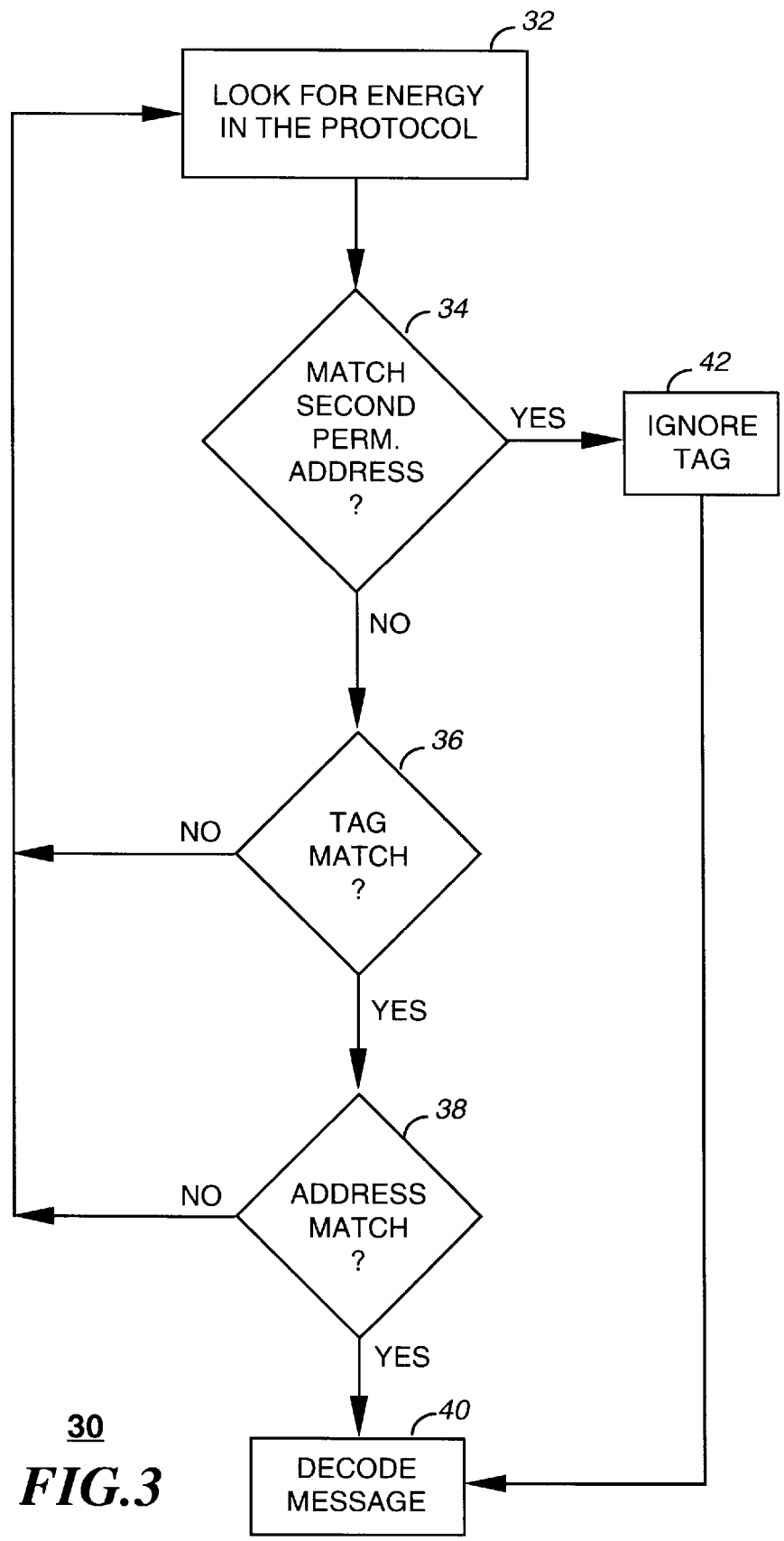
FIG. 3 is a flow chart illustrating a method in accordance with the present invention.

Referring to FIG. 3, a method 30 is shown of operating a selective call receiver device that roams a plurality of separate simulcast areas within a messaging system including a specific area where the selective call receiver device shares the same address with a second selective call receiver device but where only one of the selective call receiver device or the second selective call receiver device is able to decode a message broadcast in the specific area, comprising the steps at the selective call receiver device of receiving a target address (preferably a short address having less than 4 bytes of information a short address is particularly advantageous in such a system because it takes less time to transmit and subsequently uses less channel capacity), at least one tag representative of the specific area, and an associated message. Then, the selective call receiver device decodes the associated message when both the target address and the at least one tag representative of the specific area match an address and a tag stored in a memory location within the selective call receiver device. Otherwise, the selective call receiver device ignores the associated message when either the target address or the at least one tag representative of the specific area fail to match the tag and the address stored. Preferably, the at least one tag is an SSID, but of course the tag can take many forms as contemplated within the scope of the present invention. Additionally, the selective call receiver can be programmed to receive a separate message that contains an address that is decodable by the selective call receiver device irrespective of the at least one tag representative of the specific area that is broadcasted to the selective call receiver device. An example of such an address can be considered a "permanent" or "global" or "long" address.

The selective call receiver device preferably looks for energy in the specific protocols being used. For instance, a pager that uses Motorola's FLEX™ protocol would not necessarily decode a message sent using the POCSAG protocol unless the FLEX™ device was programmed to do so. Once the protocol is identified at step 32, the device checks for a permanent address or global address that is decodable by the selective call receiver device irrespective the tag broadcasted to the selective call receiver device. If such a global address is found at decision block 34, the device can ignore tags broadcast by a base station transmitter at step 42 and subsequently decode the message at step 40. The device also seeks for a tag match at decision block 36. If no tag match is found, then the method returns to searching for the protocol at step 32. If a tag match is found, then the device searches for an address match. If the addresses fail to match, then the method returns to searching for the protocol at block 32 as before. If the tag matches at decision block 36 and the address matches at decision block 38, then the device proceeds to decode the message sent at block 40. Of course, it is contemplated within the present invention that the method could reverse the order described above and check for a matching address first and then a matching tag.

In another aspect of the present invention, a method for validating an address received at a roaming selective call receiver in a messaging system having a limited number of local addresses repetitively used among a plurality of separate simulcast areas using frequencies and/or simulcast system identifiers (SSIDs) associated with local system frequencies comprises the steps at the selective call receiver of receiving one of the limited number of local addresses, an SSID, and an associated message and decoding the associated message when the SSID and the one of the limited number of local addresses match an SSID and an address stored in a memory location within the selective call receiver. The method further comprises the step of ignoring the associated message when either the one of the limited number of local addresses or the SSID fail to match the address or the SSID stored in the selective call receiver.

The method above may further comprise the step at a home input terminal of storing a priority value assigned to the SSID for the selective call receiver in a subscriber database and forwarding the priority value and an associated message to an output terminal. The step of forwarding can be done when a particular selective call receiver user notifies the home input terminal that the user will be within the region of a particular output controller terminal or regions of more than one particular output controller terminal. Then, an attempt is made to match the SSID on at least one of the available frequencies at the output controller terminal. Then, the associated message is transmitted on at least one of the available frequencies matching the highest priority value to the SSID having the highest priority value.

The method may further comprise the step at a selective call receiver of receiving another one of the limited number of local addresses and decoding the associated messages irrespective of the SSID that is broadcasted to the selective call receiver. This may require an override type of function within the subscriber device. Additionally, the selective call receiver may receive messages on global addresses or long addresses which would likewise decode the message irrespective of the tag broadcasted within the localized zone where the subscriber device might reside.

Figure 4:
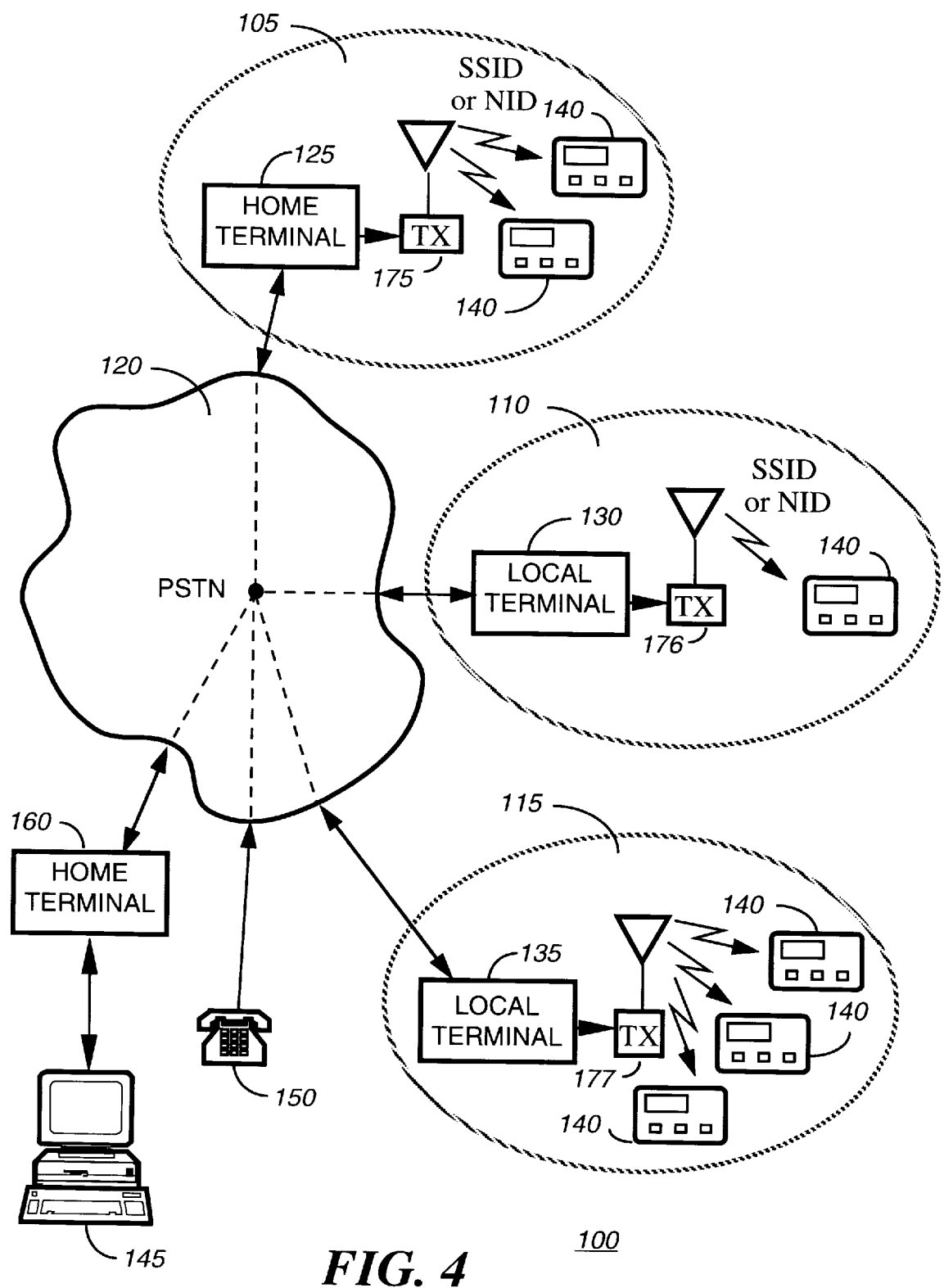
FIG. 4 is a selective call system base station in accordance with the present invention.

In another aspect of the present invention and with reference to FIG. 4, a roaming selective call messaging system 100 using network roaming identifiers (NIDs) associated with network wide services and simulcast system identifiers (SSIDs) associated with local system services for transmission of messages to a plurality of selective call receivers comprises an input device (such as a computer 145 or telephone 150) and a home input terminal 160 or 125 for storing a priority value assigned to at least one SSID, an address, and an associated message for at least one of the plurality of selective call receivers in a subscriber database. Additionally, the system would further comprise an output controller terminal (125, 130 or 135) networked (preferably via a network 120 such as a public switching telephone network (PSTN) to the home input terminal for receiving the priority value, the at least one SSID, the address, and the associated message from the home input terminal. In the example shown, device 125 may serve as both a home input terminal and an output controller terminal. Preferably, the output controller terminal matches the at least one SSID on at least one of the available frequencies at the output controller terminal. In addition, the messaging system would further comprise a transmitter (175, 176, or 177) for transmitting the at least one SSID, the address, and the associated message on at least one of the available frequencies to a selective call receiver or transceiver 140 (see FIG. 5) having a memory containing an address and at least one SSID, the selective call receiver further having a decoder that only decodes the associated message when the address and the at least one SSID in memory matches the address and SSID broadcasted by the transmitter. Preferably, the selective call receiver has a second address that decodes the associated message irrespective of the SSID that is broadcast to the selective call receiver as previously described.

Figure 5:
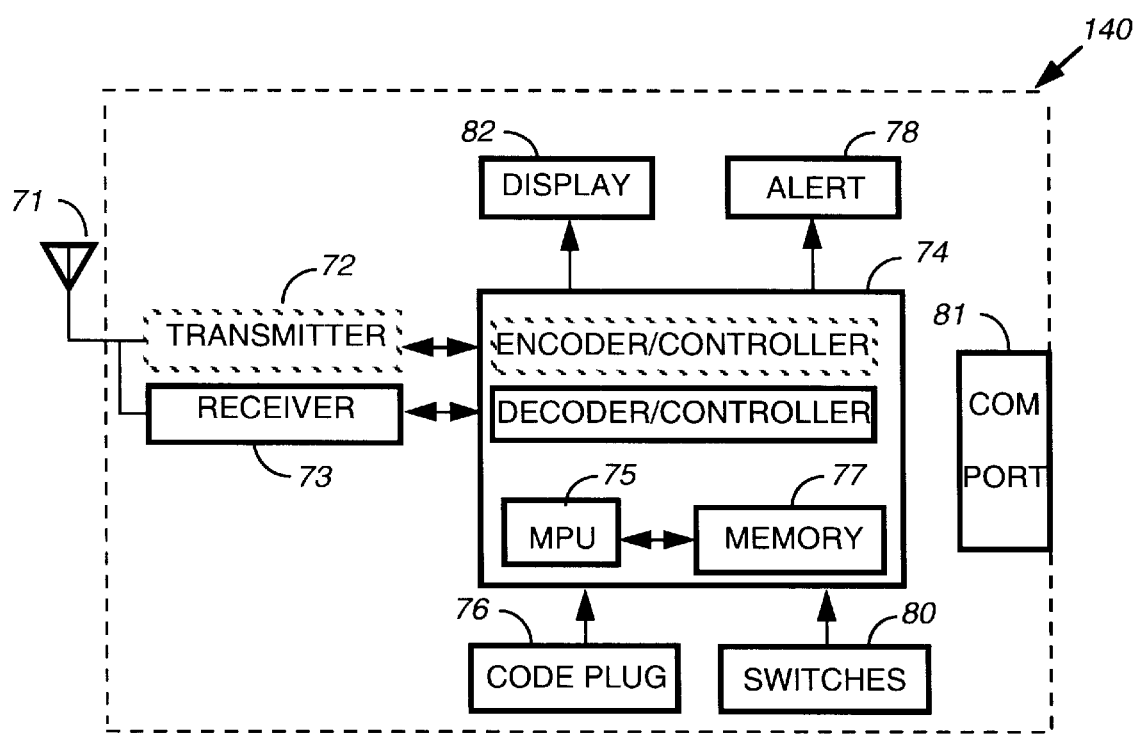
FIG. 5 is a selective call receiver or transceiver in accordance with the present invention.

Referring to FIG. 5 and in accordance with the present invention, a selective call device 140 such as a selective call receiver or transceiver that may roam among a plurality of separate simulcast areas within a messaging system including a specific area that requires the selective call device to share the same address with at least another selective call device in at least one of the plurality of separate simulcast areas that is not the specific area preferably comprises a receiver for receiving a target address, at least one tag representative of the specific area ("the tag") such as an SSID, and an associated message. Additionally, the device further comprises a processor for decoding the associated message when the target address and the tag match an address and a tag stored in a memory location within the selective call receiver unit and which is further programmable to ignore the associated message when either the target address or the tag does not match the tag and the address stored. The device 140 optionally includes an address stored in the memory location that is decodable by the selective call receiver device irrespective of the tag that is broadcasted to the selective call receiver device. Additionally, the device 140 may further include a transmitter to form a selective call transceiver in accordance with the present invention.

Again with reference to FIG. 5, the selective call device 140 comprises a selective call receiver 73 coupled to a decoder and a controller (74) and a selective call transmitter 72 coupled to the controller and an encoder (74). The transceiver 140 preferably further comprises a memory 77 coupled to the controller, wherein the memory contains a list of preferred tags or identifiers such as Simulcast System Identifiers, Network Identifiers, Zone Identifiers, Sub-zone Identifiers, city name, transmitter ID or any other tag that would identify a specified area. The selective call device will preferably decode messages that have short addresses when both the short address and the tag matches the short address and tag stored in the selective call device memory. Alternatively, the tags and/or addresses can reside in another memory location such as the code plug 76. The selective call device can further comprise a means of notifying the user of the selective call device that a message has been received. Such means of notifying can include either a display 82 such a liquid crystal display or a tactile or audible alert 78 such as a transducer (such as a speaker in a Motorola Tenor™ Voice Pager) or vibrator motor for silent alerts.

Operationally, the device 140 further includes an antenna 71 for intercepting transmitted RF signals and optionally for transmitting RF signals via a transmitter 72. The antenna 71 couples a received signal to a receiver 73, the receiver 73 and the transmitter 72 forming a transceiver. The transceiver produces a data stream representative of a demodulated received signal coupled to a decoder/controller 74. The transceiver (72, 73) is also responsive to a modulation input such as data received from the decoder/controller 74 to frequency modulate a carrier signal for transmission out of the device 140. As is well known in the art, the decoder/controller 74 may include a central processing unit such as a microprocessor 75 or the like for processing demodulated signal information in accordance with the software stored in a memory 77 of the decoder/controller 74. The decoder/controller 74 is also responsive to inputs from one or more switches 80 or other input devices to generate data that is coupled to the transceiver (72, 73) for transmission out from the device 140. The RF signals transmitted by the transmitter units of a paging subsystem typically include control information containing an address that identifies a particular device 140 and any necessary zone information and/or queries. The page message information follows the control information. The decoder/controller 74 decodes a received address and tag by comparing it with one or more addresses and tags stored in a code plug or code memory 76. If the decoder/controller 74 detects a match, an alert signal may be generated by the device 78 as previously explained. The switches 80 may be actuated by a user to select between the types of alerts as well as for inputting information to the memory 77 and causing a message stored in the memory of the decoder/controller 74 to be accessed for display on a display 82. The switches 80 may also provide additional functions such as reset, read, delete, etc. as is well known. It will be apparent that the switches may also form a keyboard. Alternative or additional input devices may also be included in or connected to the subscriber unit such as a touch panel, mouse, etc. The device 140 may also include a conventional communication port 81 for hardwire connection to a wired subsystem as well.

It should be understood that the disclosed embodiments are merely examples and the invention is not restricted thereto. It will be understood by those skilled in the art that variations and modifications can be made within the scope and spirit of the present invention as defined by the appended claims.

What is claimed is:

1. A method of operating a selective call receiver device that roams a plurality of separate simulcast areas within a messaging system including a specific area where the selective call receiver device shares the same address with a second selective call receiver device but where only one of the selective call receiver device or the second selective call receiver device is able to decode a message broadcast in the specific area, comprising the steps at the selective call receiver device of:

receiving a target address, at least one tag representative of the specific area, and an associated message;

decoding the associated message when both the target address and the at least one tag representative of the specific area match an address and a tag stored in a memory location within the selective call receiver and otherwise ignoring the associated message when either the target address or the at least one tag representative of the specific area fail to match the tag and the address stored; and receiving a separate message that contains an address that is decodable by the selective call receiver device irrespective of the at least one tag representative of the specific area that is broadcasted to the selective call receiver device.

2. The method of claim 1, wherein the step of receiving at least one tag comprises the step of receiving a simulcast system identifier (SSID).

3. The method of claim 1, wherein the step of receiving address comprises the step of receiving a short address having less than 4 bytes.

4. A method for validating an address received at a roaming selective call receiver in a messaging system having a limited number of local addresses repetitively used among a plurality of separate simulcast areas using frequencies and/or simulcast system identifiers (SSIDs) associated with local system frequencies, comprising the selective call receiver steps of:

receiving one of the limited number of local addresses, a simulcast system identifier, and an associated message;

decoding the associated message when simulcast system identifier and the one of the limited number of local address match a simulcast system identifier and an address stored in a memory location within the selective call receiver;

ignoring the associated message when either the one of the limited number of local addresses or the simulcast system identifier fail to match the address or the simulcast system identifier stored in the selective call receiver; and receiving another one of the limited number of local addresses and decoding the associated messages irrespective of the simulcast system identifier that is broadcasted to the selective call receiver.

5. The method of claim 4, wherein the method further comprises the steps of storing a priority value assigned to the SSID for the selective call receiver in a subscriber database at a home input terminal;

forwarding the priority value and an associated message to the output terminal;

matching the SSID on at least one of the available frequencies at the output controller terminal; and transmitting the associated message on at least one of the available frequencies matching the highest priority value to the SSID having the highest priority value.

6. The method of claim 5, wherein the step of forwarding the priority value and the associated message to the output terminal is done when a particular selective call receiver user notifies the home input terminal that the user will be within the region of a particular output controller terminal or regions of more than one particular output controller terminal.

7. An roaming selective call messaging system using network roaming identifiers (NIDs) associated with network wide services and simulcast system identifiers (SSIDs) associated with local system services for transmission of messages to a plurality of selective call receivers, comprising:

a home input terminal for storing a priority value assigned to at least one SSID, an address, and an associated message for at least one of the plurality of selective call receivers in a subscriber database;

an output controller terminal networked to the home input terminal for receiving the priority value, the at least one SSID, the address, and the associated message from the home input terminal;

a transmitter for transmitting the at least one SSID, the address, and the associated message on at least one of the available frequencies; and a selective call receiver having a memory containing an address and a second address and at least one SSID, the selective call receiver further having a decoder that decodes the associated message when the address and the at least one SSID in memory matches the address and SSID broadcasted by the transmitter or decodes the associated message irrespective of the SSID when the second address matches the address broadcasted by the transmitter.

8. A selective call receiver device that may roam among a plurality of separate simulcast areas within a messaging system including a specific area that requires the selective call receiver device to share the same address with at least another selective call receiver device in at least one of the plurality of separate simulcast areas that is not the specific area, the selective call receiver device, comprising:

a receiver for receiving a target address, at least one tag representative of the specific area, and an associated message;

a processor for decoding the associated message when the target address and the at least one tag representative of the specific area match an address and a tag stored in a memory location within the selective call receiver unit and which is further programmable to ignore the associated message when either the target address or the at least one tag representative of the specific area does not match the tag and the address stored; and a transmitter.

9. The selective call receiver device of claim 8, wherein the receiver receives at least one tag that is selected from the group consisting of a simulcast system identifier (SSID), color codes, transmitter identifiers, Network Identifiers (NID), Service Provider Identifiers (SPID), Zone Identifiers (ZID), Subzone Identifiers (ZID) and frequency or any combination thereof.

10. A selective call receiver device that may roam among a plurality of separate simulcast areas within a messaging system including a specific area that requires the selective call receiver device to share the same address with at least another selective call receiver device in at least one of the plurality of separate simulcast areas that is not the specific area, the selective call receiver device, comprising:

a receiver for receiving a target address, at least one tag representative of the specific area, and an associated message; and a processor for decoding the associated message when the target address and the at least one tag representative of the specific area match an address and a tag stored in a memory location within the selective call receiver unit and which is further programmable to ignore the associated message when either the target address or the at least one tag representative of the specific area does not match the tag and the address stored unless the target address matches a second address stored in a second memory location.

* * * * *